July 12, 1960 S. M. MARTIN 2,944,746
APPARATUS FOR TAKING UP AND SUPPLYING STRAND MATERIAL
Filed Sept. 19, 1957 2 Sheets-Sheet 1

INVENTOR.
S. M. MARTIN
BY A.C. Schwarz, Jr.
ATTORNEY

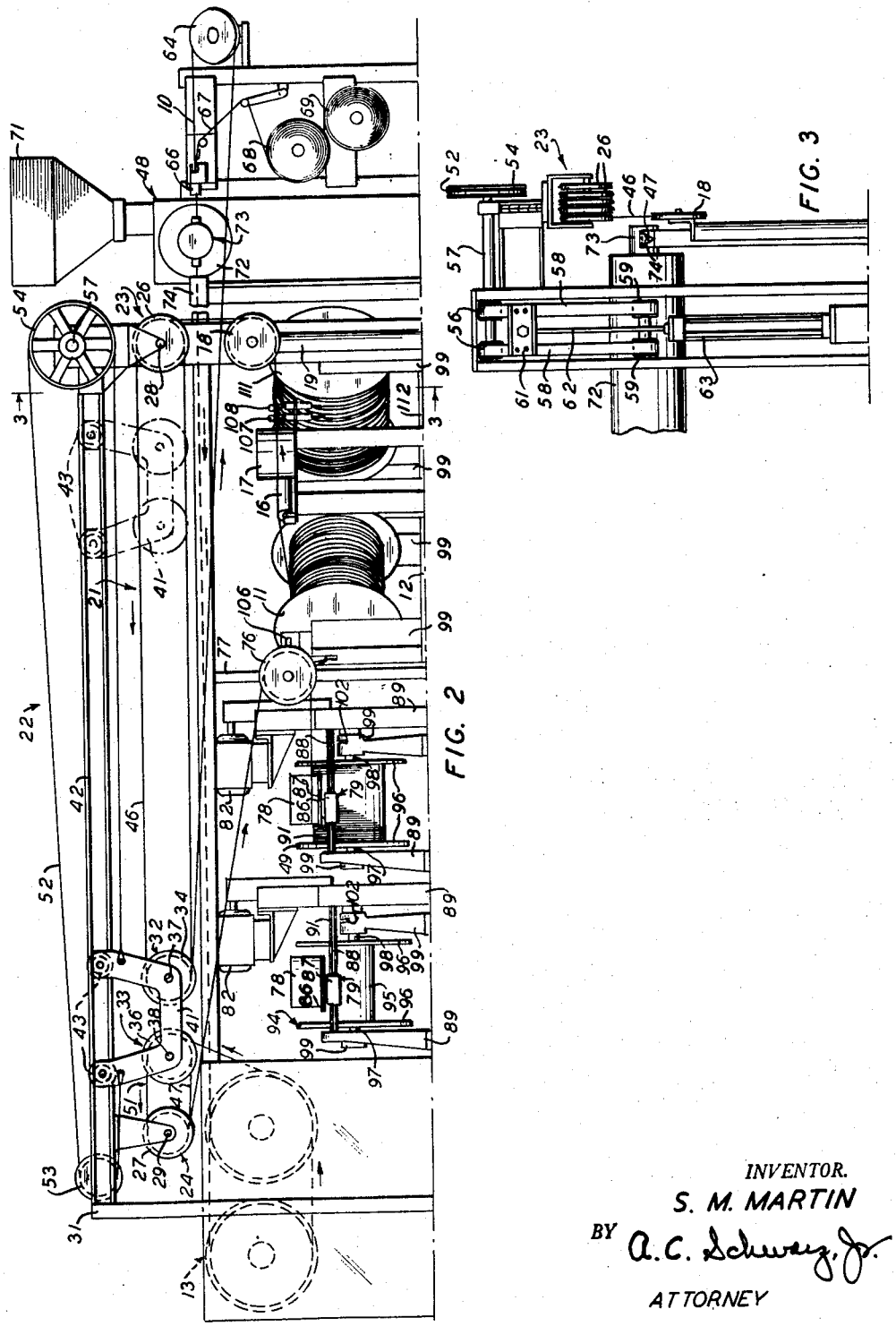

United States Patent Office 2,944,746
Patented July 12, 1960

2,944,746

APPARATUS FOR TAKING UP AND SUPPLYING STRAND MATERIAL

Samuel M. Martin, Lutherville, Md., assignor to Western Electric Company, Incorporated, New York, N.Y., a corporation of New York Filed Sept. 19, 1957, Ser. No. 684,964

3 Claims. (Cl. 242—25)

This invention relates to apparatus for taking up and supplying strand material, and more particularly, although not exclusively, to apparatus for accumulating and supplying strand material so constructed that when an amount of strand material is being removed from one accumulating means a proportional amount of strand material is accumulated by another accumulating means.

In general, insulated electric conductors are manufactured by means of a substantially continuous process in which an elongated core is advanced continuously from a supply thereof through a series of manufacturing apparatus or processes, such as continuous extrusion apparatus, to produce the finished insulated conductor.

In the operation of continuous extrusion apparatus to manufacture covered cores, a core of an indefinite length, which may comprise one or more individual strands of material, each of which may be bare or covered with a suitable material, is advanced continuously from one rotating supply through the apparatus which forms a covering of insulating material around the core. When one length of the core on one rotating supply means is almost exhausted, another length of the core on another rotatable supply means is connected thereto to start a new length of core through the extrusion apparatus.

In the past it has been extremely difficult to connect a new length of core from a rotatable supply to one almost completely exhausted core without stopping the apparatus. Stoppage of the apparatus slows production and causes waste by producing oversized and non-uniform coverings of insulating material. Also, when one takeup means has become filled, it is necessary to transfer the processed core to another takeup means without interrupting the advancement of the core through the apparatus.

Therefore, an object of the present invention is to provide new and improved apparatus for taking up and supplying strand material.

A further object of the present invention is to provide apparatus for supplying strand material continuously to one or more manufacturing processes, advancing the strand material continuously through the processes, and winding the processed strand material on successive takeup reels without the necessity of interrupting the movement of the strand material through the manufacturing processes.

Another object of the invention is to provide new and improved apparatus for supplying continuously an advancing core to a manufacturing process and taking up the processed core without the necessity of interrupting the advancement of the core through the process.

Other and more specific objects of the invention include the improvements in the construction and cooperative relationship of the component parts which go into making up an improved accumulating means.

Other objects and features of the invention will be more readily understood from the following detailed description of a specific embodiment of the invention when read in conjunction with the accompanying drawings in which:

Fig. 2 is a fragmental, front elevation view of the apparatus shown in Fig. 1, and Fig. 3 is a fragmental sectional view of the apparatus taken along line 3—3 on Fig. 2.

In reference to the drawings, like numerals are used to designate the same or similar elements throughout the several views.

Figure 1:
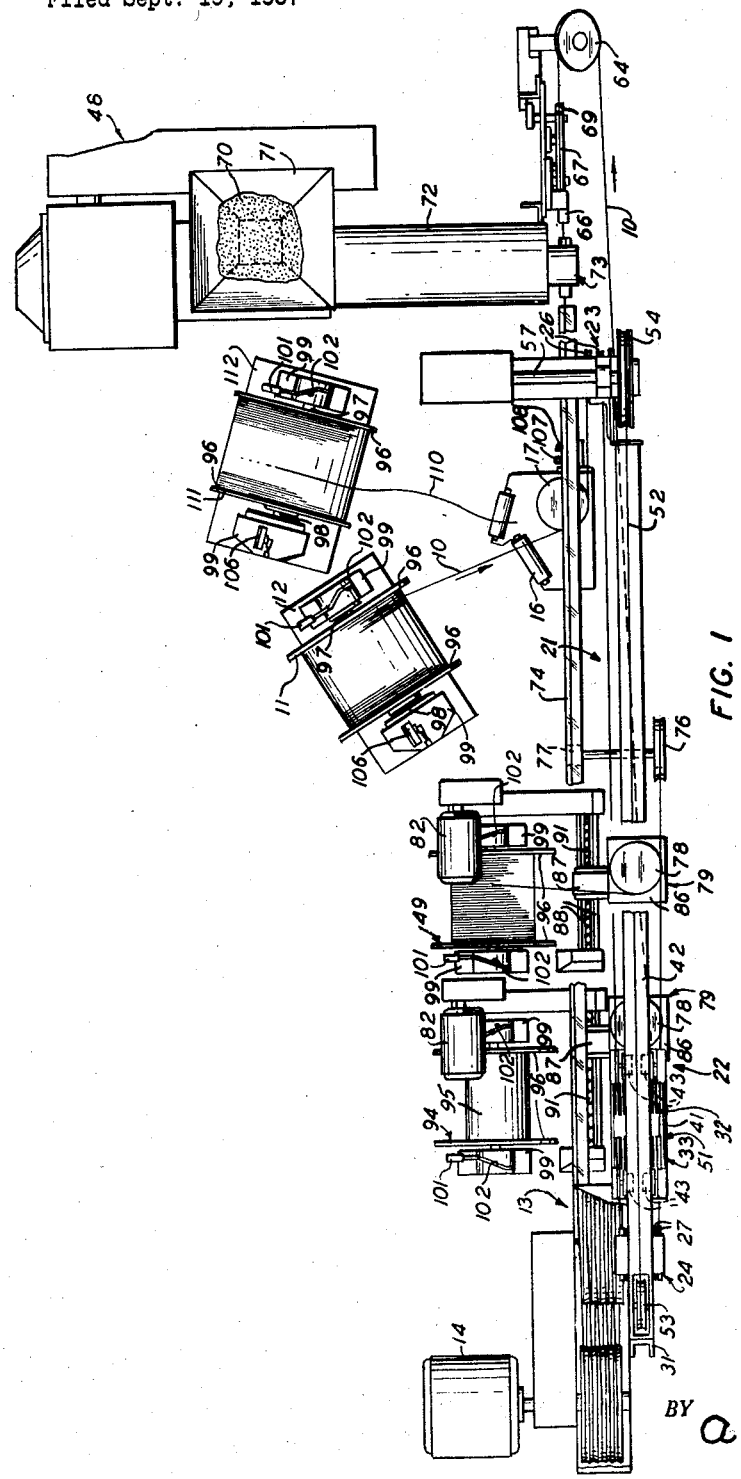
Fig. 1 is a fragmental, top plan view of an apparatus embodying the invention.

In the apparatus shown in Figs. 1 and 2, a filamentary core 10 consisting of one or more individual strands of material, each of which is individually insulated with a suitable material, is contained upon a supply reel 11. The reel 11 is mounted rotatably on a frame 12 so that the core may be withdrawn therefrom by means of a conventional, multiple sheave strand advancing capstan, designated generally by the numeral 13. The capstan 13 is driven at a substantially constant rate in a counterclockwise direction, as viewed in Fig. 2, by means of a conventional motor 14 (Fig. 1) or other suitable means.

The core 10 is advanced by the capstan 13 over a rotatable roller 16, to and around a rotating drum guide 17, to and around a rotatable sheave 18 secured rigidly to a support member 19, to a supply accumulator, designated generally by the numeral 21, of an accumulating unit designated generally by the numeral 22.

The accumulating unit 22 comprises two groups 23 and 24 of stationary, juxtaposed, individually-rotatable sheaves 26—26 and 27—27 mounted on fixed axes on common shafts 28 and 29, all respectively, secured to a frame 31. The accumulating unit also is provided with two groups 32 and 33 juxtaposed, individually-rotatable sheaves 34—34 and 36—36 mounted on common shafts 37 and 38, all respectively, secured adjacent to opposing ends of a horizontally movable carriage 41, which is suspended from a monorail track 42 by means of a plurality of rollers 43—43 on each side of the track 42. The carriage 41 is movable between a normal position illustrated in solid lines in Fig. 2 and an extended position represented in phantom lines in Fig. 2.

The core 10 is drawn by the capstan 13 around one of the group 23 of stationary, juxtaposed, individually-rotatable sheaves 26 to and around one of the group 32 of movable, juxtaposed, individually-rotatable sheaves 34, then back to a second of the group 23 of stationary sheaves 26 and back and forth alternately to and around the sheaves 26 and 34 of both groups 23 and 32 until the core 10 has passed around the entire number of each group 23 or 32 of sheaves 26 or 34, respectively, or any desired number thereof depending upon the length of the accumulated core 10 desired.

The groups 32 and 33 of movable sheaves cooperate with the associated group 23 and 24 of fixed sheaves to form a plurality of horizontal expandable and retractable loops 46—46 and 47—47, in the path of travel of the core 10 as it travels from the supply reel 11 to an extruder, designated generally by the numeral 48, and from the capstan 13 to a takeup reel 49, all respectively, to form two accumulators. The one accumulator 21 is associated with the supply reel 11 and the other accumulator, designated generally by the numeral 51, is associated with the takeup reels. This arrangement permits the stoppage of the movement of the core 10 from the supply reel 11 or to the takeup reel 49, or both from the supply reel and the takeup reel, while the extruder 48 operates continuously without interruption.

One end of a steel strand 52 is secured to one end of the carriage 41. The strand 52 is passed to and around a sheave 53, to and around a strand capstan 54, to which a portion of the strand 52 is secured rigidly to prevent slippage therebetween. The opposite end of the strand 52 is secured to the opposite end of the carriage 41.

The strand capstan 54 and a pair of nonslipping-type belt pulleys 56—56 are secured rigidly to a rotatable shaft 57 (Fig. 3). A pair of endless, nonslipping-type belts 58—58 pass around the belt pulleys 56—56 and around a pair of idler pulleys 59—59. A clamp 61, which is clamped to the two belts 58—58, is secured rigidly to a clamp rod 62 which reciprocates in an air cylinder 63. In normal operation, sufficiently low pressure is maintained in the air cylinder 63 so that the tension created in the core 10 by the simultaneous operation of the capstan 13 and the takeup reel 11 in the path of travel of the core 10 on one side of the accumulator unit 22 and the supply reel 11 in the path of travel of the core 10 on the other side of the accumulator unit 22 will allow the carriage 41 and the groups 32 and 33 of movable sheaves to remain in the position illustrated by solid lines in Fig. 2. However, if the force applied on the core 10 by the takeup reel 49 is removed, the carriage 41 will move to the right and also, if the supply of the core 10 is stopped, the resultant forces will cause the trolley 41 to move to the right.

The core 10 is drawn by the capstan 13 from the accumulator 21 to and around a stationary rotatable guide sheave 64, having a root surface on the upper portion thereof tangential with respect to the axis of a core tube of the conventional, continuous extruder 48, to change the direction of travel of the core and direct it through a conventional forming guide 66 for forming a flat, longitudinal paper tape 67 into a substantially, cylindrical tube around the core 10. The paper tape 67 is supplied from one of two supply rolls 68 or 69. The tape 67 is utilized in this particular type of jacketed core or cordage to make a section of the insulating jacket more readily removable when stripped from the end thereof in the process of making telephone cords.

The extruder 48 is provided to extrude plastic material on the core 10 to form an insulating covering or jacket around the core 10. Suitable plastic material 70 is placed in the hopper 71 and from there it flows into an extrusion cylinder 72. A screw, not shown, is positioned within the extrusion cylinder 72 and is rotatable to knead and advance the plastic material 70 toward the delivery end of the extrusion bore where an extrusion head, designated generally by the numeral 73, is secured.

The core 10 is advanced through the core tube in the extrusion head 73 of the extruder 48, wherein the insulating covering is formed therearound, and along a V-shaped trough 74, which is partially filled with a cooling fluid, to an air wiper, not shown, provided for the purpose of removing moisture from the insulating covering of the processed core 10. The wiped, insulated core emerges from an air wiper and passes around the capstan 13 several times and thereafter travels to one of the group 33 of movable, juxtaposed, individually-rotatable sheaves 36—36 secured to the horizontally, movable carriage 41 and then to and around one of the group 24 of stationary, juxtaposed, individually-rotatable sheaves 27—27 secured to the frame 31.

The insulated core is then passed to and around a second of the group 33 of movable sheaves 36 and again back and forth alternately around the sheaves of both groups 24 and 33 until the core 10 passes around the entire number of each group 24 and 33 of sheaves or any desired number thereof depending upon the length of the accumulated processed core 10 desired.

The processed core 10 passes from a sheave 27 of the stationary group 24 to and around a guide sheave 76 secured to a support member 77 and then around a rotating drum 78 which is secured to a conventional distributing means designated generally by the numeral 79. The drum 78 is moved transversely of the takeup reel 49 by the distributing means 79 to distribute the processed core 10 evenly across the winding surface of the takeup reel 49.

A distributor carriage 86 is mounted slidably, by means of bearings 87—87, on a pair of horizontally extending spaced traverse rods 88—88 for transverse movement therealong. The traverse rods 88—88 are supported fixedly at their opposing ends by upright members 89—89. The distributor carriage 86 is provided with a follower, not shown, for engaging a double opposed threaded traversing screw 91 so that as the follower of the distributor carriage 86 reaches the end of travel of one thread on the screw 91 it will be directed into the other thread to reverse the movement of the carriage 86 as the traverse screw 91 is rotated unidirectionally by an endless belt and pulley arrangement, not shown.

When the reel 49 is rotated by a motor 82 to take up the processed core 10, the traversing screw 91 moves the distributor carriage 86 transversely of the winding surface of the reel 49 and parallel to the rotating axis thereof so as to move the distributor 79 which in turn directs the processed core 10 evenly back and forth along the surface of the reel 49.

The adjustment of the speed of rotation of the screw 91 and thus the distributor 79, may be achieved by changing the effecvtive diameter of a pulley, not shown, secured to the motor 82 for driving the endless belt and pulley arrangement referred to above.

The motor 82 is preferably a wound rotor slip-ring type of induction motor having suitable resistance and reactance connected in the primary and secondary circuits thereof in such proportions that various input voltages will develop speed-torque characteristics which would form curves substantially parallel to each other throughout the selected speed range of the motor 82 from an empty reel condition to a full reel condition. The drive motor 82 is provided with suitable electrical control means, not shown, for stopping, starting, and controlling the speed of the motor independently as desired.

A second takeup reel 94, mounted and driven in an identical manner to that of the reel 49, is provided in axial alignment with the takeup reel 49. The takeup reels 49 and 94 are identical in construction and are of a conventional design. Each reel, 49 and 94, includes a cylindrical winding drum 95 and a pair of flange-like reel heads 96—96 secured fixedly at opposing ends of the winding drum 95. Each of the reels 49 and 94 is mounted between centering supports 97 and 98, which are mounted on brackets 99—99 and provided with levers 101—101 which co-act with inclined surfaces in slots 102—102 in the brackets 99—99 to lock the reels 49 and 94 in position and also to provide rapid locking and unlocking means.

The reel supporting centers 98—98 are connected operatively to pulleys, not shown, for rotation therewith. The centers 98—98 are provided with eccentric dog projections, not shown, which engage eccentrically positioned apertures, not shown, in the heads 96—96 of the reels 49 and 94 and are used for transmitting torque to the reels 49 and 94 from the motors 82—82. The pulleys, secured to the centers, are operably connected by means of non-slipping type endless belts, not shown, to drive pulleys, not shown, which are driven rotatably by the electric drive motors 82—82.

A second supply reel 111, containing a length of core 110 similar to the core 10 on the reel 11, is similarly mounted rotatably on a support 112 so that the core 110 may be withdrawn therefrom and advanced continuously through the extruding apparatus 48 in the manner described with respect to the core 10.

The supply reels 11 and 111 are identical in construction and are of a conventional design in which each includes a cylindrical winding drum similar to the winding drum 95 of the takeup reels 49 and 94 and a pair of flange-like reel heads 96 secured fixedly at opposing ends of the winding drum. The reels 11 and 111 are mounted between centering supports 97 and 98 which are mounted on brackets 99—99. The centers 97 and 98 are provided with levers 101—101 which co-act with inclined surfaces in slots 102—102 in the brackets 99—99 to lock the reels 11 and 111 in position.

The supply reels 11 and 111 are positioned so that straight lines, tangential with respect to the top position of their cylindrical drums and centrally thereof, are tangential with respect to the peripherial surface of the rotating drum 17.

A suitable braking means 106 is connected operably to the center 98 associated with each of the supply reels 11 and 111 to apply a braking force thereto so that a predetermined tension is exerted on the core 10 or 110 as it is withdrawn from the reel 11 or 111. The braking forces applied to the reels 11 and 111 are controlled by the position of the brake adjusting levers 107 and 108, respectively. The brakes 106—106 may also be used to control the forces on the core 10 or 110 being processed at that time to control the position of the trolley 41.

When substantially all of the core 10 is withdrawn from the reel 11, the trailing end of the core 10 from the exhausted reel 11 must be stopped temporarily so that it can be connected to the leading end of the core 110 wound on the full reel 111 in order that the capstan 13 and the extruding apparatus 48 may remain in continuous operation. These ends of the cores 10 and 110 are connected or spliced to each other by a suitable type of connector or splice member, not shown. Such a connector or splice member usually is not intended to form a continuous length of material in the finished product and therefore must be removed from that portion of the processed core 10 or 110 in which it is included.

Operation

In normal operation, sufficiently low air pressure is maintained in the air cylinder 63 to allow the trolley 41 to remain in the solid line position, as shown in Fig. 2. However, assuming that the supply reel 11 or 111 being unwound at a given time becomes empty, the operator turns off the the motor 82 associated with the takeup reel 49 or 94 being utilized at that time and grasps the trailing end of the core 10 or 110 being paid off of the empty reel 11 or 111 and attaches it to the leading end of the core 110 or 10 on the new supply reel 111 or 11. During the time the operator is performing this operation, the force produced opposite to the direction of the travel of the core 10 or 110 by the capstan 13, which is resisted by the operator's stopping the core 10 or 110 passing into the supply accumulator 21, causes the groups 32 and 33 of movable sheaves and the carriage 41 to be gradually pulled to the right, as viewed in Fig. 2. The movement of the carriage 41 to the right provides the necessary amount of core 10 or 110 so that the passage of the core through the extruder 48 is uninterrupted. Before the carriage 41 and groups 32 and 33 of movable sheaves move too far to the right, the operator will have attached the trailing end of the core 10 or 110 from the exhausted reel 11 or 111 to the leading end of the core 110 or 10 from the full reel 111 or 11 and started the motor 82. The groups of movable sheaves 32 and 33 and the carriage 41 subsequently will resume their normal operating positions as a result of the force applied to the carriage 41 by the air cylinder 63 through the steel strand 52.

Assuming that the takeup reel 49 or 94, onto which the processed core 10 or 110 is being reeled, has become completely filled, or filled with the desired amount of core 10 or 110, the operator grasps the core 10 or 110, cuts it, and attaches it to the empty takeup reel 49 or 94. While the operator is performing these steps, the constant air pressure in the air cylinder 63 produces a force which is not countered by the usual force applied to the processed core 10 or 110 by the takeup reel 49 or 94 therefore, the forces caused by the air pressure on the piston and thus the piston rod 62 and clamp 61 cause the belts 58—58 to rotate slowly. The rotation of the timing belts 58—58 cause the strand capstan 54 to rotate slowly in a counterclockwise direction, as viewed in Fig. 2, which in turn causes the steel strand 52 to pull the trolley 41 to the right so that the core 10 or 110, which is not being taken up by either of the takeup reels 49 or 94 at that time, is accumulated in accumulator 51 between the fixed group 24 of sheaves 27—27 and the movable group 33 of sheaves 36—36.

Before the carriage 41 is moved too far to the right, the operator will have attached the end of the processed core 10 or 110 to the new takeup reel 49 or 94 and the force applied to the processed core 10 or 110 by the takeup reel 49 or 94, onto which it is being reeled, will result in the carriage 41 being moved to its normal position, as shown in Fig. 2.

It is obvious that if it is desirable to change one or both the supply reels 11 and 111 and the takeup reels 49 and 94, simultaneously, the above-described apparatus may be utilized to accomplish such a result. This is possible because as the carriage 41 is being moved to the right by the removal of the core 10 or 110, from the supply accumulator 21, which is passed continuously through the extruder 48 by the capstan 13, an equal length of processed core 10 or 110 will be taken up by the takeup accumulator 51 as it is furnished by the capstan 13 from the supply accumulator 21. This may be done if the loops of core 10 or 110 in both of the accumulators 21 and 51 are equal in number.

It should be noted that apparatus embodying the present invention could be utilized in methods and apparatus similar to those illustrated in the patent to Wilburn, No. 2,776,801, issued January 8, 1957, in which it is desirable to have always a path of travel between the strand supply means, through the processing means, and to the takeup means of a constant predetermined length and still provide paths of travel of the strand between the supply means and processing means, and between the processing means and takeup means of variable lengths.

It is to be understood that the above-described arrangements are simply illustrative of the principles of the invention. Other arrangements may be devised by those skilled in the art which embody the principles of the invention and fall within the spirit and scope thereof.

What is claimed is:

1. In an apparatus for taking up and supplying strand material including strand supply means, strand take-up means and means for advancing a strand along a predetermined path from the supply means to the take-up means, the improved accumulating means which comprises a movable carriage, a first travelling sheave mounted rotatably on said carriage, a first stationary sheave mounted rotatably between said supply means and said carriage and in alignment with said first travelling sheave on the carriage, a second travelling sheave mounted rotatably on said carriage, and a second stationary sheave mounted rotatably between said carriage and said take-up means and in alignment with said second travelling sheave on the carriage, all of said sheaves being positioned to have the advancing strand pass seriatim thereover so that all of said sheaves cooperate to define a portion of the predetermined path of the strand, whereby when the carriage is moved in one direction the path of travel of the strand between the supply means and the carriage is shortened while the path of the strand between the carriage and the take-up means is lengthened, and when the carriage is moved in the opposite direction the path of travel of the strand between the supply means and the carriage is lengthened while the path of travel of the strand between the carriage and the take-up means is shortened thereby permitting continuous advancement of the strand through the intermediate portion of its path of travel when either of the supply means and the take-up means is stopped.

2. In an apparatus for taking up and supplying strand material which includes strand supply means, strand take-up means, means for advancing a strand along a predetermined path from the supply means to the take-up means, a carriage movable back and forth along an axis thereof, a first group of travelling sheaves mounted rotatably side by side on said carriage, a first group of stationary sheaves mounted rotatably side by side between said supply means and said carriage and in alignment with said first group of travelling sheaves on the carriage, a second group of travelling sheaves mounted rotatably side by side on said carriage, and a second group of stationary sheaves mounted rotatably side by side between said carriage and said take-up means and in alignment with said second group of travelling sheaves on the carriage, all of said sheaves being positioned to have the advancing strand pass seriatim thereover so that all of said sheaves cooperate to define a portion of the predetermined path of the strand, whereby when the carriage is moved in one direction the path of travel of the strand between the supply means and the carriage is shortened while the path of travel between the carriage and the take-up means is lengthened, and when the carriage is moved in the opposite direction the path of travel of the strand between the supply means and the carriage is lengthened while the path of travel of the strand between the carriage and the take-up means is shortened thereby permitting continuous advancement of the strand along the intermediate portion of its path of travel while either of the supply means and the take-up means is inoperative.

3. Apparatus for taking up and supplying strand material, which comprises means for supplying a strand, means for taking up the strand supplied by the supplying means, means for performing a continuous manufacturing operation on the strand at an intermediate point along the path of the strand from the supply means to the take-up means, a carriage movable back and forth along an axis thereof, a first group of travelling sheaves mounted rotatably side by side on said carriage, a first group of stationary sheaves mounted rotatably side by side between said supply means and said carriage and in alignment with said first group of travelling sheaves on the carriage, a second group of travelling sheaves mounted rotatably side by side on said carriage, a second group of stationary sheaves mounted rotatably side by side between said carriage and said take-up means and in alignment with said second group of travelling sheaves on the carriage, all of said sheaves being so positioned that a strand withdrawn from the supplying means may be passed seriatim back and forth around the first group of stationary sheaves and the first group of travelling sheaves to form first accumulator loops therebetween, through the manufacturing-operation means, passed seriatim back and forth around the second group of travelling sheaves and the second group of stationary sheaves to form second accumulator loops therebetween and finally to the take-up means, and means for advancing a strand from the supply means through the first accumulator loops, through the manufacturing-operation means, through the second accumulator loops and to the take-up means, whereby when the carriage is moved in one direction the first accumulator loops are shortened while the second accumulator loops are lengthened and when the carriage is moved in the opposite direction the first accumulator loops are lengthened while the second accumulator loops are shortened thereby permitting continuous advancement of the strand through the manufacturing-operation means even though one of the supplying means and the take-up means is inoperative.

References Cited in the file of this patent

UNITED STATES PATENTS

| | | |
|---|---|---|
| 1,629,097 | De Ybarroudo | May 17, 1927 |
| 1,734,546 | Veling | Nov. 5, 1929 |
| 1,823,885 | Cherry | Sept. 22, 1931 |
| 2,016,935 | Strang et al. | Oct. 8, 1935 |
| 2,357,389 | Ferm | Sept. 5, 1944 |
| 2,776,801 | Wilburn | Jan. 8, 1957 |